United States Patent
Laur et al.

(10) Patent No.: US 9,588,517 B2
(45) Date of Patent: Mar. 7, 2017

(54) AUTOMATED VEHICLE CONTROL TAKE-OVER ALERT TIMING BASED ON INFOTAINMENT ACTIVATION

(71) Applicant: Delphi Technologies, Inc., Troy, MI (US)

(72) Inventors: Michael H. Laur, Mission Viejo, CA (US); Indu Vijayan, Sunnyvale, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/798,937

(22) Filed: Jul. 14, 2015

(65) Prior Publication Data

US 2017/0015331 A1    Jan. 19, 2017

(51) Int. Cl.
| | | |
|---|---|---|
| B60W 50/14 | (2012.01) | |
| G05D 1/00 | (2006.01) | |
| B60W 50/08 | (2012.01) | |
| B60W 50/00 | (2006.01) | |

(52) U.S. Cl.
CPC ......... G05D 1/0061 (2013.01); B60W 50/082 (2013.01); B60W 50/14 (2013.01); B60W 2050/0072 (2013.01)

(58) Field of Classification Search
CPC .. B60W 50/082; B60W 50/14; B60W 50/143; B60W 50/146; B60W 2050/0072; B60W 2050/0096; G05D 1/0055; G05D 1/0061
See application file for complete search history.

(56) References Cited

U.S. PATENT DOCUMENTS

| | | | | |
|---|---|---|---|---|
| 5,774,069 A * | 6/1998 | Tanaka | ...................... | B60T 7/12 |
| | | | | 180/167 |
| 6,226,570 B1 * | 5/2001 | Hahn | ................... | B60K 28/066 |
| | | | | 701/1 |
| 8,433,470 B1 * | 4/2013 | Szybalski | .............. | B62D 1/286 |
| | | | | 701/23 |
| 8,874,301 B1 * | 10/2014 | Rao | ...................... | B60K 28/066 |
| | | | | 180/272 |
| 8,954,217 B1 * | 2/2015 | Montemerlo | ......... | B60W 30/00 |
| | | | | 701/26 |

(Continued)

FOREIGN PATENT DOCUMENTS

DE    102012112802 A1 *  6/2014

OTHER PUBLICATIONS

EPO machine translation of DE 102012112802 (original DE document published Jun. 26, 2014).*

*Primary Examiner* — Behrang Badii
*Assistant Examiner* — David Testardi
(74) *Attorney, Agent, or Firm* — Lawrence D. Hazelton

(57) ABSTRACT

A system for automated operation of a vehicle includes an infotainment-device and a controller. The infotainment-device is operable to provide an infotainment-activity to an operator of a vehicle. The controller is operable to estimate a take-over-interval for an operator to prepare for a mode-transition from automated-control of the vehicle by the controller to manual-control of the vehicle by the operator. The take-over-interval is determined based on the infotainment-activity of the operator. The controller is operable to notify the operator that the mode-transition is needed at least the take-over-interval prior to a take-over-time.

7 Claims, 2 Drawing Sheets

(56) References Cited

U.S. PATENT DOCUMENTS

| | | | |
|---|---|---|---|
| 2007/0198145 A1 | 8/2007 | Norris et al. | |
| 2009/0228175 A1 | 9/2009 | Borgesson | |
| 2014/0009276 A1* | 1/2014 | Backhouse | B60Q 9/008 340/436 |
| 2014/0303827 A1 | 10/2014 | Dolgov et al. | |
| 2015/0015386 A1* | 1/2015 | Langenhan | B60W 50/14 340/438 |
| 2015/0070160 A1* | 3/2015 | Davidsson | B60W 50/14 340/457 |
| 2015/0088357 A1* | 3/2015 | Yopp | G05D 1/0061 701/23 |
| 2015/0094899 A1* | 4/2015 | Hackenberg | B60W 50/082 701/23 |
| 2015/0105960 A1* | 4/2015 | Pilutti | G05D 1/0061 701/23 |
| 2015/0314780 A1* | 11/2015 | Stenneth | B60W 30/00 701/23 |
| 2016/0041553 A1* | 2/2016 | Sato | B60W 50/0098 701/23 |
| 2016/0214618 A1* | 7/2016 | Wulf | B60W 40/08 |

\* cited by examiner

AUTOMATED VEHICLE CONTROL TAKE-OVER ALERT TIMING BASED ON INFOTAINMENT ACTIVATION

TECHNICAL FIELD OF INVENTION

This disclosure generally relates to a system for automated operation of a vehicle, and more particularly relates to a system that estimates a take-over-interval for an operator to prepare to assume manual-control of the vehicle, where the take-over-interval is determined based on an infotainment-activity of the operator.

BACKGROUND OF INVENTION

Passenger vehicles (e.g. automobiles) with various degrees of automation have been proposed. Vehicles equipped with automated speed control, commonly known as cruise control, are well-known. Fully automated or autonomous vehicles where the operator is not engaged with any aspect of operating the vehicle are being developed. However, it is contemplated that unexpected traffic scenarios or situations will arise when it will be preferable to have the operator assume manual control of the vehicle.

SUMMARY OF THE INVENTION

If a vehicle is fully automated, the operator may have nothing to do with actually driving the vehicle. That is, the operator may do little more than designate a destination for an automated vehicle, and the automated vehicle takes care of all further operation. This will allow the operator to engage in a variety of infotainment activities such as participate in a conference call, draft a memo, play a video-game such as a virtual-reality game, or watch a movie or sporting event. However, if a situation arises where the operator must assume manual-control of the vehicle, and the operator is engrossed in some infotainment-activity that might delay or slow the preparation of the operator to assume manual control, then it is advantageous for the vehicle automation to give some advanced warning that manual-control is needed.

In accordance with one embodiment, a system for automated operation of a vehicle is provided. The system includes an infotainment-device and a controller. The infotainment-device is operable to provide an infotainment-activity to an operator of a vehicle. The controller is operable to estimate a take-over-interval for the operator to prepare for a mode-transition from automated-control of the vehicle by the controller to manual-control of the vehicle by the operator. The take-over-interval is determined based on the infotainment-activity. The controller is operable to notify the operator that the mode-transition is needed at least the take-over-interval prior to a take-over-time.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
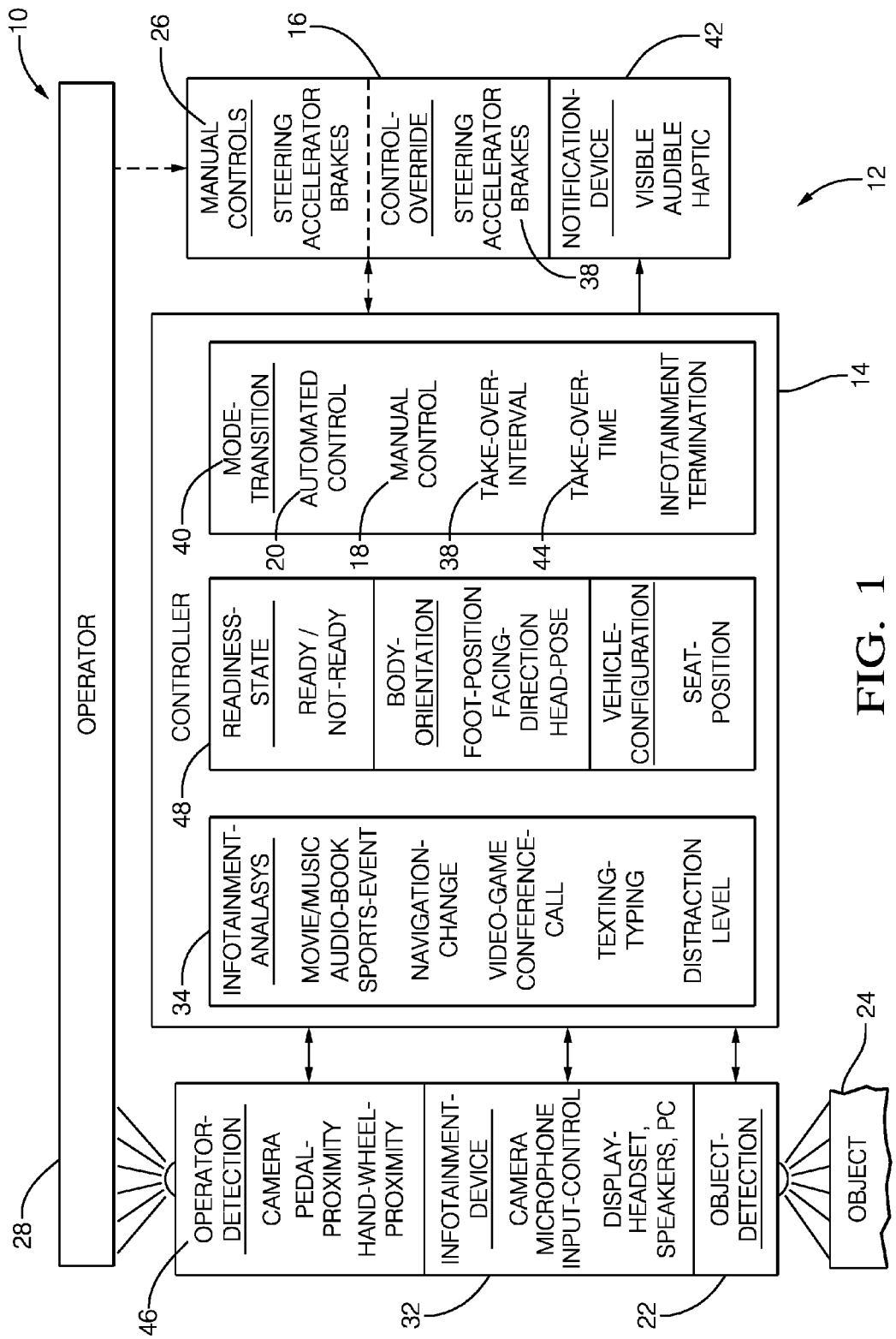
FIG. 1 is a diagram of a system for control of an automated vehicle in accordance with one embodiment.

FIG. 1 illustrates a non-limiting example of a system 10 for automated operation of a vehicle 12. In general, the system 10 includes a controller 14 configured to autonomously operate (i.e. drive) the vehicle 12 using vehicle-controls 16 to control steering and acceleration/braking of the vehicle 12. The controller 14 may include a processor (not specifically shown) such as a microprocessor or other control circuitry such as analog and/or digital control circuitry including an application specific integrated circuit (ASIC) for processing data as should be evident to those in the art. The controller 14 may include memory (not specifically shown), including non-volatile memory, such as electrically erasable programmable read-only memory (EEPROM) for storing one or more routines, thresholds and captured data. The one or more routines may be executed by the processor to perform steps for operating the vehicle 12 under automated-control 20 or manual-control 18 as in more detail below.

The system 10 may include an object-detection device 22 operable to detect an object 24 such as an other-vehicle, pedestrian, roadway marker, and the like. The controller 14 receives information from the object-detection device 22 that is useful to maneuver the vehicle 12. The object-detection device 22 may include, but is not limited to, an imager device such as a camera, a radar device, and/or a lidar device, as will be recognized by those in the art. The system 10 may also include a global-positioning system or GPS (not shown) to provide further information to maneuver the vehicle 12, as will be recognized by those in the art. The vehicle-controls 16 include manual-controls 26 so an operator 28 is able to manually operate or drive the vehicle 12 when the need arises, and may include control-override devices 30 so the controller 14 can control the steering, acceleration, and braking of the vehicle 12 even if the operator 28 is, for example, moving the steering-wheel (not shown) of the vehicle 12.

The system 10 may include an infotainment-device 32 operable to provide an infotainment-activity 34 to the operator 28 of the vehicle 12. As used herein, infotainment refers to any form of information or entertainment that can be received or perceived by the operator 28, and the operator 28 does so by way of the infotainment-device 32. In some instances, infotainment may include interaction by the operator 28 as will be explained in more detail. By way of example and not limitation, infotainment that is merely received by the operator 28 includes music, movies, sporting-events, and audio-books. Examples of infotainment-activities that may elicit some sort of response or interaction by the operator 28 includes video-games, surfing the web, designating a new or revised destination on a navigation-device of the vehicle 12, text messaging, typing a memo, or making a presentation during a phone or video conference call.

As any of the infotainment-activities suggested may distract or occupy the operator 28 to the point where more than one or two seconds notice is necessary for the operator 28 to be prepared to take or assume the manual-control 18 of the vehicle 12, the controller 14 is advantageously configured or operable to estimate a take-over-interval 38 for the operator 28 to prepare for a mode-transition 40 from automated-control 20 of the vehicle 12 by the controller 14 to manual-control 18 of the vehicle 12 by the operator 28. The take-over-interval 38 is determined based on the infotainment-activity 34 engaged by the operator 28. The controller 14 is also operable to notify the operator 28 by way of a notification-device 42 that the mode-transition 40 is needed. The notification-device 42 is activated at least the take-over-interval 38 prior to a take-over-time 44, which is the time that the controller 14 estimates that the operator 28 need to prepare for the mode-transition 40 to manual-control 18 from automated-control 20.

Some non-limiting examples of situations when the mode-transition 40 to manual-control 18 from automated-control 20 is necessary include construction-zones or accident-sites where the travel-path of the vehicle 12 is diverted from an expected path that is based on stored roadway information. For example, if an accident is blocking the roadway, the vehicle 12 may need to be manually steered off the roadway into an area that is not well-known by the controller 14 because the area is not included in a roadway database. Another example is when weather conditions such as snow and/or ice obscure roadway markers or obstacles, or accumulate on the vehicle 12 in a way that obscures the view of the roadway and surrounding area by a camera or lidar device that is part of the object-detection device 22.

Further examples of scenarios or situations that may require additional time for the operator to prepare for the mode-transition 40 include when the operator is playing a video-game that includes or necessitates wearing a display-headset such as a virtual-reality headset that must be removed before the operator is prepared for the mode-transition 40. Another example is when the operator 28 is participating in a conference-call in such a way that the operator 28 is operating a personal-computing-device (e.g. a lap-top PC or tablet-type PC) that must be deactivated or otherwise placed in a secure location before the operator 28 is prepared for the mode-transition 40.

To better accommodate the operator 28 during the infotainment-activity 34 selected, the interior of the vehicle 12 may be reconfigurable to be more comfortable. For example, a seat occupied by the operator 28 may be rotatable so the operator 28 can sit sideways in the vehicle 12, or may be able to be pushed back so far that the steering wheel does not interfere with the use of a keyboard or other input-control device (e.g. mouse, trackball, or touch-pad) for a personal-computing device (PC). For example, if the operator 28 is participating in a conference-call includes positioning a seat (e.g. adjusting the seat-position) of the vehicle 12 to other than what may typically be referred to as a manual-control-position, then the seat-position must be returned to the manual-control-position for the operator to prepare for the mode-transition.

While some may not consider certain infotainment-activities such as listening to music as distracting, most would agree that other infotainment-activities such as watching a sports-event are certainly distracting. Accordingly, when the infotainment-activity 34 is characterized as distracting, the infotainment-activity is preferably terminated for the operator 28 to prepare for the mode-transition 40. The characterization of the infotainment-activity 34 as distracting may be based on a distraction level that is preassigned to each of the various infotainment-activities. It is contemplated that the distraction level may be modified based on prior behavior exhibited by the operator 28. For example, if the operator 28 previously took longer than unexpected to turn-off a sports-event, the take-over-interval 38 associated with watching a sports-event may be increased.

Prior to making the mode-transition 40 from automated-control 20 to manual-control 18, there is preferably some determination that the operator 28 is indeed ready to take manual-control of the vehicle 12. The system may include an operator-detection device 46 operable or useable by the controller 14 to determine a readiness-state 48 (e.g. ready/not ready) of the operator 28. The operator-detection device 46 may include, but is not limited to, a camera to determine a body-orientation such as a facing-direction and/or a head-pose of the operator 28, a capacitive based pedal-proximity sensor to determine a foot-position of the operator 28 (e.g. determine if the foot of the operator covering the accelerator pedal and/or the brake-pedal), and a hand-wheel-proximity sensor to determine if the operator's hands are in contact with the steering-wheel. If the operator 28 has a head-pose that indicates that the operator 28 is looking at the roadway, a facing-direction that is normal for manual-control 18 (e.g. body facing forward), the feet are covering or in contact with the brake-pedal and/or accelerator-pedal, and the operator 28 is touching the steering wheel, then the operator is likely ready to assume manual-control 18 of the vehicle 12.

By way of example and not limitation, if the infotainment-activity 34 is something that is easily stopped and the operator 28 is in a position suitable for assuming manual control except for moving the hands and feet a few centimeters to make contact with the manual-controls 26, the take-over-interval may be five seconds (5 s). However, if the operator 28 is holding a PC or input-control (e.g. keyboard, game-control-device) and the seat is moved back such that the operator 28 cannot readily operator the steering wheel or the brakes, a suitable value for the take-over-interval 38 may be twenty seconds (20 s)

Even if the operator 28 is in the proper position described above for manual-control 18, but the operator has not terminated the infotainment-activity 34 (e.g. did not pause or turn-off a movie), then the mode-transition 40 may be delayed when the operator 28 does not terminate the infotainment-activity 34. If the assumption of manual-control 18 by the operator 28 is imperative, the controller 14 may be configured to terminate the infotainment-activity 34 when the operator 28 does not terminate the infotainment-activity 34. If the infotainment-activity 34 is something that the controller 14 is unable to terminate, the controller 14 may be configured to stop the vehicle 12 when the operator 28 does not terminate the infotainment-activity 34. If the roadway on which the vehicle is traveling includes a shoulder, the controller may be further configured to steer the vehicle 12 to a shoulder of a roadway when the operator 28 does not terminate the infotainment-activity 34.

Figure 2:
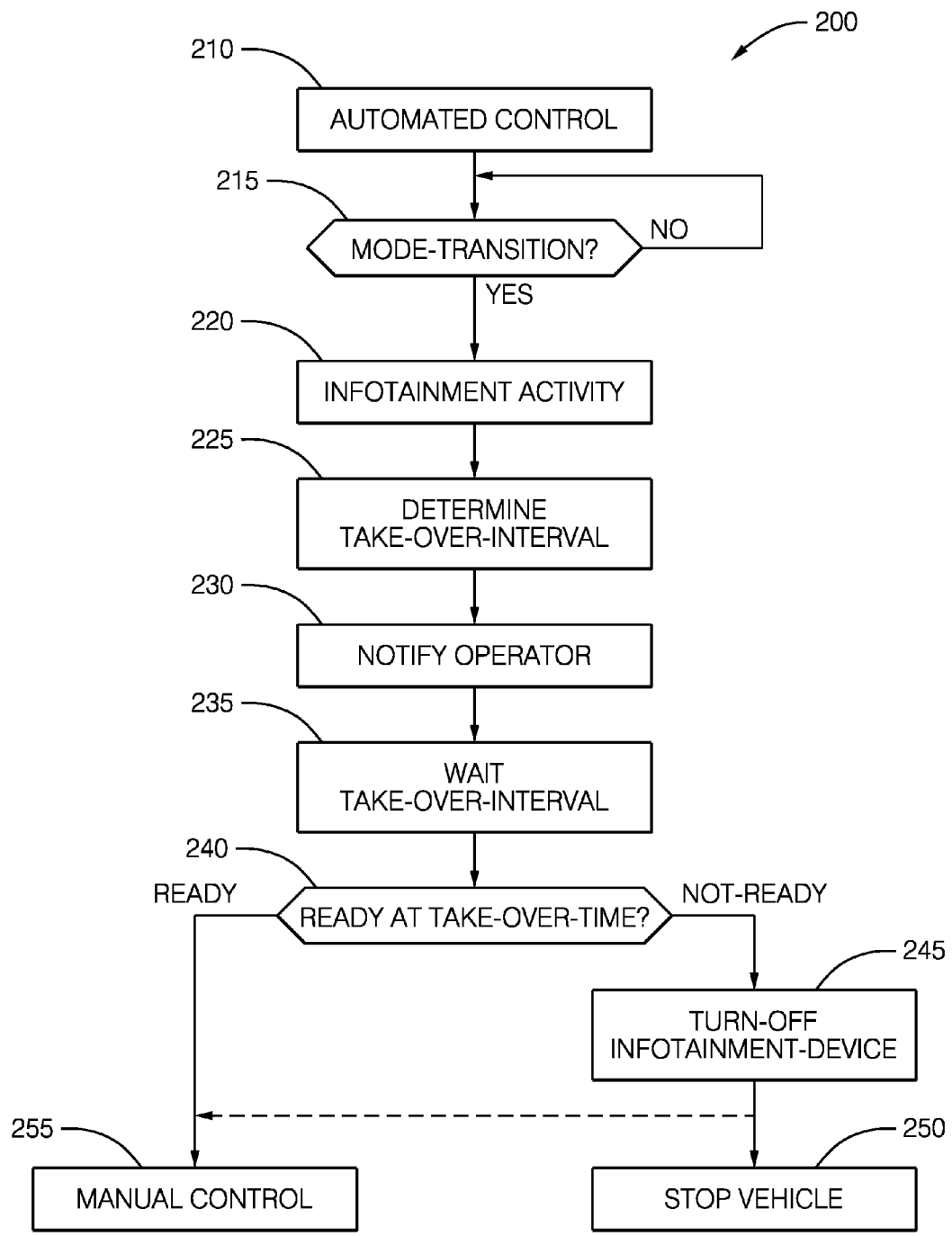
FIG. 2 is flowchart of a method of operating the system of FIG. 1 in accordance with one embodiment.

FIG. 2 illustrates a non-limiting example of a method 200 for automated operation of the vehicle 12.

Step 210, AUTOMATED CONTROL, may include the operator 28 engaging the automated-control 20 by, for example, a voice command from the operator 28 that is detected by a microphone connected to the controller 14, and/or the operator 28 operating an input-control to designate a destination to a navigation device for the vehicle 12.

Step 215, MODE-TRANSITION?, may include the controller 14 determining that an upcoming roadway is not sufficiently defined in a data-base for automated-control, or detecting via vehicle-to-vehicle (V2V) or vehicle-to-infrastructure (V2I) that an accident has occurred on a roadway that the vehicle 12 must travel. If a mode-transition 40 is not necessary (NO), Step 215 may be repeated until a situation is detected that warrants a mode-transition 40. If such a situation is detected (YES), the method 200 proceeds to step 220. Step 215 may also include determining the take-over-time 44 based on how soon the vehicle 12 will arrive at a location where the mode-transition 40 from automated control 20 to manual-control 18 is necessary.

Step 220, INFOTAINMENT ACTIVITY, may include the controller 14 determining if the infotainment-activity 34 is activated, and which of the activities is activated.

Step 225, DETERMINE TAKE-OVER-INTERVAL, may include recalling from memory a previously stored value for the take-over-interval 38 for the particular infotainment-activity 34 that is activated. Step 225 may also include further estimating (i.e. increasing) the take-over-interval 38 if the operator-detection device 46 indicates that the operator 28 is well out-of-position for the operator 28 to assume manual-control 18. For example, even though the operator 28 is watching a moving which could be terminated quickly, the seat in which the operator 28 resides may have been moved way-back or may be inclined, so some additional time is needed for the readiness-state 48 of the operator 28 to become READY.

Step 230, NOTIFY OPERATOR, may include the controller 14 activating one or more options of the notification-device 42 at a time corresponding to the take-over-interval 38 prior to the take-over-time 44.

Step 235, WAIT TAKE-OVER-INTERVAL, may include the controller 14 activating a timing counter to wait for the take-over-interval 38 to expire after the operator 28 has been notified by the notification-device 42.

Step 240, READY AT TAKE-OVER-TIME?, may include the controller 14 verifying that the operator 28 is properly positioned and is at least in close contact to the manual-controls 26 (i.e. the operator 28 is READY) before proceeding to step 255 where the operator 28 assumes manual-control 18 of the vehicle 12. However, if for some reason the operator 28 is NOT READY, the method 200 may execute some optional steps which are described below.

Step 245, TURN-OFF INFOTAINMENT-DEVICE, is an optional step that may include the controller 14 shutting off any or all options of the infotainment-device 32 so the operator is not distracted. This step may also include an audible notification that, for example, the movie has been stopped so the operator 28 does not wonder why the movie has stopped. If the operator 28 is properly positioned for manual-control 18, and the only reason the controller 14 indicated NOT READY was because the infotainment-activity 34 had not been stopped by the operator 28, the method may optionally proceed to step 255.

Step 250, STOP VEHICLE, is another optional step that may include the controller 14 stopping the vehicle 12, possibly steering the vehicle 12 to a shoulder on the roadway to get out of the way of other traffic. This step may be an advantageous alternative if the operator 28 is, for example, unable or unwilling to interrupt a conference-call and would rather have the vehicle 12 stop rather than have the controller forcibly terminate the conference-call.

Step 255, MANUAL CONTROL, may include the notification-device issuing an audible message announcing, for example, "Manual Control Resumed".

Accordingly, a system 10 for automated operation of a vehicle 12, a controller 14 for the system 10 and a method 200 of operating the system 10 is provided. The system 10 is generally configured to estimate or anticipate how much time it will take the operator 28 to stop or interrupt the infotainment-activity 34 that the operator 28 is engaged with when a situation arises that requires the operator 28 to assume manual-control 18 if the vehicle 12 is to continue traveling While this invention has been described in terms of the preferred embodiments thereof, it is not intended to be so limited, but rather only to the extent set forth in the claims that follow.

We claim:

1. A system for automated operation of a vehicle, said system comprising:
    an infotainment-device operable to provide an infotainment-activity to an operator of a vehicle;
    a controller operable to determine when the infotainment-device that provides the infotainment-activity is activated, and estimate a take-over-interval for the operator to prepare for a mode-transition from automated-control of the vehicle by the controller to manual-control of the vehicle by the operator, wherein the take-over-interval is determined based on the infotainment-device that is activated, said controller operable to notify the operator that the mode-transition is needed at least the take-over-interval prior to a take-over-time, wherein the controller is configured to deactivate the infotainment-device when the operator does not deactivate the infotainment-device.

2. The system in accordance with claim 1, wherein the infotainment-activity includes one of listening to music, listening to an audio-book, watching a movie, watching a sports-event, playing a video-game, typing a memo, operating a navigation-device and participating in a conference-call.

3. The system in accordance with claim 2, wherein the infotainment-device is a video-game that includes a display-headset.

4. The system in accordance with claim 2, wherein the infotainment-device is a personal-computing-device.

5. The system in accordance with claim 1, wherein the mode-transition is delayed when the operator does not deactivate the infotainment-device.

6. The system in accordance with claim 1, wherein the controller is configured to stop the vehicle when the operator does not deactivate the infotainment-device.

7. The system in accordance with claim 1, wherein the controller is configured to steer the vehicle to a shoulder of a roadway when the operator does not deactivate the infotainment-device.

* * * * *